(12) United States Patent
Gauzner et al.

(10) Patent No.: US 8,323,018 B2
(45) Date of Patent: Dec. 4, 2012

(54) THERMAL COMPENSATED STAMPERS/IMPRINTERS

(75) Inventors: Gennady (Gene) Gauzner, Livermore, CA (US); Hong Ying Wang, Fremont, CA (US)

(73) Assignee: Seagate Technology LLC, Cupertino, CA (US)

( * ) Notice: Subject to any disclaimer, the term of this patent is extended or adjusted under 35 U.S.C. 154(b) by 90 days.

(21) Appl. No.: 13/043,327

(22) Filed: Mar. 8, 2011

(65) Prior Publication Data
US 2012/0058312 A1    Mar. 8, 2012

Related U.S. Application Data

(62) Division of application No. 11/606,993, filed on Dec. 1, 2006, now Pat. No. 7,919,029.

(51) Int. Cl.
*B29C 33/38* (2006.01)
*B29C 59/02* (2006.01)
(52) U.S. Cl. ........................ 425/385; 425/810
(58) Field of Classification Search .................. 425/385, 425/470, 810; 264/293
See application file for complete search history.

(56) References Cited

U.S. PATENT DOCUMENTS

| | | | |
|---|---|---|---|
| 6,623,788 B1 * | 9/2003 | Wang et al. | 427/130 |
| 6,814,898 B1 * | 11/2004 | Deeman et al. | 264/1.33 |
| 2006/0038316 A1 * | 2/2006 | Hofmann | 264/225 |

FOREIGN PATENT DOCUMENTS
JP      2002-373457    * 12/2002
* cited by examiner

*Primary Examiner* — Christina Johnson
*Assistant Examiner* — Robert Dye

(57) ABSTRACT

A method of manufacturing a stamper/imprinter for patterning a recording medium via thermally assisted nano-imprint lithography, comprising steps of: selecting a recording medium for patterning, comprising a substrate with a first coefficient of thermal expasnsion (CTE); providing a first stamper/imprinter comprising a topographically patterned surface having a correspondence to a selected pattern to be formed in a surface of the medium; providing a sheet of a material having a second CTE matching the first CTE; molding a layer of a polymeric material surrounding the sheet of material and having a surface in conformal contact with the topographically patterned surface of the first stamper/imprinter; and separating the layer of polymeric material from the patterned surface of the first stamper/imprinter to form a second stamper/imprinter comprising a topographically patterned stamping/imprinting surface having a correspondence to the selected pattern.

18 Claims, 8 Drawing Sheets

THERMAL COMPENSATED STAMPERS/IMPRINTERS

CROSS-REFERENCE TO RELATED APPLICATION

This application is a divisional of U.S. patent application Ser. No. 11/606,993, filed Dec. 1, 2006.

FIELD OF THE INVENTION

The present invention relates to an improved method for fabricating stampers/imprinters utilized in the manufacture of patterned recording media and to the improved, thermal expansion compensated stampers/imprinters obtained thereby. The invention enjoys particular utility in the manufacture of ultra-high areal recording density bit patterned magnetic media and servo patterned media, e.g., hard disk media utilized in computer-related applications.

BACKGROUND OF THE INVENTION

Designers, manufacturers, and users of electronic computers and computing systems require reliable and efficient equipment for storage and retrieval of information in digital form. Conventional storage systems, such as magnetic disk drives, are typically utilized for this purpose and are well known in the art. However, the amount of information that is digitally stored continually increases, and designers and manufacturers of magnetic recording media work to increase the storage capacity of magnetic disks.

In conventional magnetic disk data/information storage, the data/information is stored in a continuous magnetic thin film overlying a substantially rigid, non-magnetic disk. Each bit of data/information is stored by magnetizing a small area of the thin magnetic film using a magnetic transducer (write head) that provides a sufficiently strong magnetic field to effect a selected alignment of the small area (magnetic grain) of the film. The magnetic moment, area, and location of the small area comprise a bit of binary information which must be precisely defined in order to allow a magnetic read head to retrieve the stored data/information.

Such conventional magnetic disk storage media incur several drawbacks and disadvantages which adversely affect realization of high areal density data/information storage, as follows:

(1) the boundaries between adjacent pairs of bits tend to be ragged in continuous magnetic films, resulting in noise generation during reading; and (2) the requirement for increased areal recording density has necessitated a corresponding decrease in recording bit size or area. Consequently, recording bit sizes of continuous film media have become extremely minute, e.g., on the order of nanometers (nm). In order to obtain a sufficient output signal from such minute bits, the saturation magnetization ($M_s$) and thickness of the film must be as large as possible. However, the magnetization quantity of such minute bits is extremely small, resulting in a loss of stored information due to magnetization reversal by "thermal fluctuation", also known as the "superparamagnetic effect".

Regarding item (2) above, it is further noted that for longitudinal type continuous magnetic media, wherein the magnetic easy axis is oriented parallel to the film plane (i.e., surface), magnetization reversal by the superparamagnetic effect may occur even with relatively large magnetic particles or grains, thereby limiting future increases in areal recording density to levels necessitated by current and projected computer-related applications. On the other hand, for perpendicular type continuous magnetic media, wherein the magnetic easy axis is oriented perpendicular to the film plane (i.e., surface), growth of the magnetic particles or grains in the film thickness direction increases the volume of magnetization of the particles or grains while maintaining a small cross-sectional area (as measured in the film plane). As a consequence, onset of the superparamagnetic effect can be suppressed for very small particles or grains of minute width. However, further decrease in grain width in perpendicular media necessitated by increasing requirements for areal recording density will inevitably result in onset of the superparamagnetic effect even for such type media.

The superparamagnetic effect is a major limiting factor in increasing the areal recording density of continuous film magnetic recording media. Superparamagnetism results from thermal excitations which perturb the magnetization of grains in a ferromagnetic material, resulting in unstable magnetization. As the grain size of magnetic media is reduced to achieve higher areal recording density, the superparamagnetic instabilities become more problematic. The superparamagnetic effect is most evident when the grain volume V is sufficiently small such that the inequality $K_\mu V/k_B T > 40$ cannot be maintained, where $K_\mu$ is the magnetic crystalline anisotropy energy density of the material, $k_B$ is Boltzmann's constant, and T is the absolute temperature. When this inequality is not satisfied, thermal energy demagnetizes the individual magnetic grains and the stored data bits are no longer stable. Consequently, as the magnetic grain size is decreased in order to increase the areal recording density, a threshold is reached for a given $K_\mu$ and temperature T such that stable data storage is no longer possible.

So-called "patterned" or "bit patterned" magnetic media ("BPM") have been proposed as a means for overcoming the above-described problem of conventional continuous magnetic media associated with magnetization reversal via the superparamagnetic effect, e.g., as disclosed in U.S. Pat. No. 5,956,216, the entire disclosure of which is incorporated herein by reference. The term "bit patterned media" ("BPM") generally refers to magnetic data/information storage and retrieval media wherein a plurality of discrete, independent regions of magnetic material which form discrete, independent magnetic elements that function as recording bits are formed on a non-magnetic substrate. Since the regions of ferromagnetic material comprising the magnetic bits or elements are independent of each other, mutual interference between neighboring bits can be minimized. As a consequence, bit patterned magnetic media are advantageous vis-à-vis continuous magnetic media in reducing recording losses and noise arising from neighboring magnetic bits. In addition, patterning of the magnetic layer advantageously increases resistance to domain wall movement, i.e., enhances domain wall pinning, resulting in improved magnetic performance characteristics.

Generally, each magnetic bit or element has the same size and shape, and is composed of the same magnetic material as the other elements. The elements are arranged in a regular pattern over the substrate surface, with each element having a small size and desired magnetic anisotropy, so that, in the absence of an externally applied magnetic field, the magnetic moments of each discrete magnetic element will be aligned along the same magnetic easy axis. The magnetic moment of each discrete magnetic element therefore has only two states: the same in magnitude but aligned in opposite directions. Each discrete magnetic element forms a single magnetic domain or bit and the size, area, and location of each domain is determined during the fabrication process.

During writing operation of patterned media, the direction of the magnetic moment of the single magnetic domain element or bit is flipped along the easy axis, and during reading operation, the direction of the magnetic moment of the single magnetic domain element or bit is sensed. While the direction of the magnetic easy axis of each of the magnetic domains, elements, or bits can be parallel or perpendicular to the surface of the domain, element, or bit, corresponding to conventional continuous longitudinal and perpendicular media, respectively, bit patterned media comprised of domains, elements, or bits with perpendicularly oriented magnetic easy axis are advantageous in achieving higher areal recording densities for the reasons given above.

Bit patterned media in disk form offer a number of advantages relative to conventional disk media. In principle, the writing process is greatly simplified, resulting in much lower noise and lower error rate, thereby allowing much higher areal recording density. In bit patterned media, the writing process does not define the location, shape, and magnetization value of a bit, but merely flips the magnetization orientation of a patterned single domain magnetic structure. Also in principle, writing of data can be essentially perfect, even when the transducer head deviates slightly from the intended bit location and partially overlaps neighboring bits, as long as only the magnetization direction of the intended bit is flipped. By contrast, in conventional magnetic disk media, the writing process must define the location, shape, and magnetization of a bit. Therefore, with such conventional disk media, if the transducer head deviates from the intended location, the head will write to part of the intended bit and to part of the neighboring bits. Another advantage of bit patterned media is that crosstalk between neighboring bits is reduced relative to conventional media, whereby areal recording density is increased. Each individual magnetic element, domain, or bit of a patterned medium can be tracked individually, and reading is less jittery than in conventional disks.

As utilized herein, the general expression "patterned recording media" is taken as encompassing different types of pattern formation and different types of recording media with patterned surfaces, including, but not limited to, servo-patterned magnetic and magneto-optical ("MO") media, track-patterned (i.e., discrete track) magnetic media, bit patterned magnetic ("BPM") media, patterned read-only ("ROM") media, and wobble-groove patterned readable compact disk ("CD-R"), readable-writable compact disk ("CD-RW") media, and digital video disk ("DVD") media. Such media have been fabricated by a variety of processing techniques, including etching processing such as reactive ion etching, sputter etching, ion milling, and ion irradiation to form a pattern comprising magnetic and non-magnetic surface areas in a layer of magnetic material on a media substrate. Several of the these processing techniques have relied upon selective removal of portions of the layer of magnetic material to form the pattern of magnetic and non-magnetic surface areas; whereas others of the processing techniques have relied upon partial removal of selected areas of the media substrate on which the magnetic layer is formed, thereby resulting in different transducer head/media surface spacings having an effect similar to formation of a pattern of magnetic and non-magnetic surface areas in the layer of magnetic material. However, a drawback associated with each of these techniques is formation of topographical patterns in the surface of the media, engendering media performance concerns such as transducer head flyability and corrosion, e.g., due to uneven lubricant thickness and adhesion.

A recently developed low cost alternative technique for fine dimension pattern/feature formation (i.e., sub-100 nm structures/features) in a substrate surface is thermally assisted nano-imprint lithography, as for example, described in U.S. Pat. Nos. 4,731,155; 5,772,905; 5,817,242; 6,117,344; 6,165,911; 6,168,845 B1; 6,190,929 B1; and 6,228,294 B1, the entire disclosures of which are incorporated herein by reference. A typical thermally assisted nano-imprint lithographic process for forming nano-dimensioned patterns/features in a substrate surface is illustrated with reference to the schematic, cross-sectional views of FIGS. 1 (A)-1 (D).

Referring to FIG. 1 (A), shown therein is a stamper/imprinter 10 (also referred to in the related art as a "mold" or "template") including a main (or support) body 12 having upper and lower opposed surfaces, with an imprinting layer 14 formed on the lower opposed surface. As illustrated, stamper/imprinter 14 includes a plurality of features 16 having a desired shape or surface contour. A workpiece 18 carrying a thin film layer 20 on an upper surface thereof is positioned below, and in facing relation to the molding layer 14. Thin film layer 20, of a thermoplastic polymer material, e.g., polymethylmethacrylate (PMMA), may be formed on the substrate/workpiece surface by any appropriate technique, e.g., spin coating.

Adverting to FIG. 1 (B), shown therein is a compressive molding step, wherein stamper/imprinter 10 is pressed into the thin film layer 20 in the direction shown by arrow 22, so as to form depressed, i.e., compressed, regions 24. In the illustrated embodiment, features 16 of the imprinting layer 14 are not pressed all of the way into the thin film layer 20 and thus do not contact the surface of the underlying substrate 18. However, the top surface portions 24a of thin film 20 may contact depressed surface portions 16a of imprinting layer 14. As a consequence, the top surface portions 24a substantially conform to the shape of the depressed surface portions 16a, for example, flat. When contact between the depressed surface portions 16a of imprinting layer 14 and thin film layer 20 occurs, further movement of the imprinting layer 14 into the thin film layer 20 stops, due to the sudden increase in contact area, leading to a decrease in compressive pressure when the compressive force is constant.

FIG. 1 (C) shows the cross-sectional surface contour of the thin film layer 20 following removal of stamper/imprinter 10. The imprinted thin film layer 20 includes a plurality of recesses formed at compressed regions 24 which generally conform to the shape or surface contour of features 16 of the molding layer 14. Referring to FIG. 1 (D), in a next step, the surface-imprinted workpiece is subjected to processing to remove the compressed portions 24 of thin film 20 to selectively expose portions 28 of the underlying substrate 18 separated by raised features 26. Selective removal of the compressed portions 24 may be accomplished by any appropriate process, e.g., reactive ion etching (RIE) or wet chemical etching.

The above-described imprint lithographic processing is capable of providing sub-micron-dimensioned features, as by utilizing a stamper/imprinter 10 provided with patterned features 16 comprising pillars, holes, trenches, etc., by means of e-beam lithography, RIE, or other appropriate patterning method. Typical depths of features 16 range from about 5 to about 200 nm, depending upon the desired lateral dimension. The material of the imprinting layer 14 is typically selected to be hard relative to the thin film layer 20, the latter comprising a thermoplastic material which is softened when heated. Thus, materials which have been proposed for use as the imprinting layer 14 include metals, dielectrics, semiconductors, ceramics, and composite materials. Suitable materials for use as thin film layer 20 include thermoplastic polymers which can be heated to above their glass temperature, $T_g$, such that the material exhibits low viscosity and enhanced flow.

Referring to FIGS. 2 (A)-2 (D), shown therein, in simplified, schematic cross-sectional views, is a series of process steps for illustrating fabrication of bit patterned or servo patterned magnetic recording media utilizing thermal imprint lithography as part of the processing methodology.

In FIG. 2 (A), a layer 70 of a thermoplastic polymer material, e.g., PMMA, covers a media substrate 72, e.g., of a suitable material (which substrate may comprise at least a surface layer of a magnetically soft material when the resultant medium is a perpendicular medium). Opposite the polymer layer 70 is a stamper/imprinter (sometimes referred to as a "mold") 74 which includes a patterned plurality of downwardly extending features 76, e.g., pillars as in the illustrated embodiment, of preselected dimensions and arrangement for forming a desired pattern in the polymer layer 70, e.g., a servo pattern or a discrete bit pattern. As indicated by the downwardly facing arrows in FIG. 2 (A), the stamper/imprinter 74 is moved toward the polymer layer 70 to form an imprinted pattern therein which is a negative image of the pattern of the downwardly extending features 76 in the form of recesses 78, as shown in FIG. 2 (B). During the imprinting process, the thermoplastic polymer layer 70 is typically maintained at an elevated temperature which facilitates the imprinting, i.e., at a temperature close to the melting or glass transition temperature $T_g$ of the polymer material. As in the embodiment shown in FIG. 1, the imprinted polymer layer may, if desired, be subjected to further processing to effect complete removal of the bottom portions of the recesses 78 to thereby expose the surface of substrate 72. Recesses 78 are then filled with a layer 80 of a magnetic recording material (or a plurality of stacked layers including seed, intermediate, etc., layers in addition to a layer of magnetic recording material), as shown in FIG. 2 (C). Excess material of layer 80 overfilling the recesses 78 (as seen in FIG. 2 (C)) is then removed via a planarization process, e.g., chemical-mechanical polishing (CMP), to leave a plurality of single elements or bits 82 each forming a single magnetic domain of a bit patterned medium.

Stampers/imprinters suitable for use in performing the foregoing patterning processes have conventionally been made from a number of materials such as etched Si wafers, etched quartz or glass, and electroformed metals, e.g., electroformed Ni, and may be manufactured by a sequence of steps as schematically illustrated in FIG. 3, which steps include providing a "master" comprised of a substantially rigid substrate with a patterned layer of a resist material thereon. The pattern, which is formed in the resist layer by conventional lithographic techniques, including, e.g., e-beam or laser beam exposure of selected areas of the resist, comprises a plurality of projections and depressions corresponding (in positive or negative image form, as necessary) to the desired pattern, e.g., a servo pattern, to be formed in the surface of the stamper/imprinter. According to the process shown in FIG. 3, stampers/imprinters are made from the "master" by initially forming a thin, conformal layer of an electrically conductive material (e.g., Ni) over the patterned resist layer and then electroforming a substantially thicker ("blanket") metal layer (e.g., Ni) on the thin layer of electrically conductive material, which electroformed blanket layer replicates the surface topography of the resist layer. Upon completion of the electroforming process, the stamper/imprinter is separated from the "master".

In practice, however, since the "master" with fragile resist layer thereon is effectively destroyed upon separation of the stamper/imprinter from the "master", a process has been developed involving forming a "family" of stampers/imprinters, as schematically illustrated in FIG. 4. As shown in the figure, the stamper/imprinter formed directly from the "master" is termed a "father" and has a reverse (i.e., negative) replica of the topographical pattern of the "master". The "father" is then utilized for forming several (illustratively two) "mothers" therefrom (e.g., as by a process comprising electroforming, as described above), and each "mother" is in turn utilized for forming several (illustratively two, for a total of four) "sons" therefrom (also by a process comprising electroforming). The "sons" are positive replicas of the "father" and are utilized as the stampers/imprinters for media patterning. Since, as described above, the "master" is effectively destroyed in the process of making the "father" therefrom, the "family" making process avoids the need for repeatedly manufacturing "master" stampers/imprinters by preserving the "father" and utilizing the "sons". Therefore, process time and cost of making "masters" is substantially reduced by means of the "family" making process.

The thus-formed "sons" are then subjected to further processing for forming stampers/imprinters with a desired dimension (i.e., size) and geometrical shape or contour, e.g., an annular disk-shaped stamper/imprinter for use in patterning of annular disk-shaped media such as hard disks, which stampers/imprinters necessarily include a circularly-shaped central aperture defining an inner diameter ("ID") and a circularly-shaped periphery defining an outer diameter ("OD").

The "family" making process, as described supra, is made possible/practical only if the "mothers" are readily separated from the "father" without incurring damage to the patterned surface(s), and the "sons" are similarly readily separated from the "mothers" without incurring damage to the patterned surface(s). As a consequence, the patterned surfaces of the "father" and the "mothers" are each provided with a coating layer of a material, termed a "release" layer and typically comprised of a passivating material, prior to formation of the respective "mothers" and "sons", for facilitating separation, i.e., "release", of the "mothers" from the "father" and the "sons" from the "mothers".

Fabrication of the stampers/imprinters is a key factor in the processing methodology for patterned media such as bit and servo patterned magnetic recording media. As indicated above, one process for fabricating stampers/imprinters for use in manufacturing patterned media comprises steps of: e-beam writing a desired pattern in a resist layer formed on a Si wafer substrate to form a "master", electroplating/electroforming Ni thereon to form a Ni "father", electroplating/electroforming Ni on the "father" to generate at least one "mother", and electroplating/electroforming Ni on the at least one "mother" to generate at least one "son". While the "family" making process for forming stampers/imprinters has resulted in great reduction in manufacturing costs, the use of Ni-based stampers/imprinters has encountered several problems, as follows: (1) the pattern features have very small dimensions with linear and irregularly contoured sidewalls, resulting in physical damage, e.g., breakage, to the pattern when separating the mothers from the fathers or when separating the sons from the mothers. Stated differently, pattern replication fidelity from one hard surface to another hard surface has reached a limit due to the extremely small feature sizes necessary for formation of certain types of patterned media, e.g., ultra-high areal recording density bit patterned media; (2) application of the necessary release layer to the Ni surfaces is very difficult, making it correspondingly difficult to achieve effective and durable imprinting; and (3) the difference (i.e., mismatch) in thermal expansion coefficient ("CTE") between the Ni-based stampers/imprinters and the resist (thermoplastic polymer) and substrate materials further reduces replication fidelity.

Therefore, while nano-imprint lithographic techniques, such as described above, afford the possibility of a low-cost, mass manufacturing technology for fabrication of sub-100 nm structures, features, etc., for semiconductor ICs, integrated optical, magnetic, and mechanical devices, the problem of non-uniform replication and sticking of the thermoplastic polymer materials to the patterned imprinting surface when the latter is applied to a large-area substrate, e.g., as in the formation of patterns in 95 mm diameter disks used in hard disk drives, arising from differences in thermal expansion/contraction characteristics of the stamper/imprinter and substrate materials, has not been adequately or satisfactorily addressed.

For example, according to conventional practices in thermal imprint lithography, it is normal for the components of the imprinting system, i.e., substrate, resist layer, and stamper/imprinter to undergo large thermal swings or cycling, e.g., within a range of about 100° C. The 100° C. increase in temperature experienced by the thin film resist layer formed of a thermoplastic polymer causes the viscosity to decrease and hence increase the fluid flow characteristics thereof, which in turn, allows accurate replication of the features of the stamper/imprinter surface. However, a significant problem associated with this technique when utilized in certain applications is the dissimilar thermal expansion/contraction characteristics of the imprinting surface and thin film resist materials due to their entirely different properties, such as the CTE, which dissimilarity results in degradation of imprint quality, as by deformation of and/or damage to the replicated thin film resist layer after the imprinting process is completed.

As described above, stampers/imprinters have conventionally been fabricated by electroforming Ni (or Cu) onto a master plate comprising a patterned photoresist, or by etching through a substrate, e.g., of silicon (Si), coated with a layer of patterned photoresist. The former technique is typically utilized in the replication of vinyl audio records and optical disks; whereas the latter technique has been utilized to fabricate stampers/imprinters having very small feature sizes, e.g., ~20 nm, by means of e-beam techniques. However, the thermal expansion/contraction characteristics of these materials are substantially and significantly different from those of either the glass, ceramic, glass-ceramic composite, or nickel-phosphorus coated aluminum (Al/Ni-P) substrates typically utilized in fabricating various types of recording media in disk form, e.g., magnetic media for use in hard disk drives, which differences in thermal expansion/contraction characteristics disadvantageously result in the above-mentioned degradation in imprint quality, e.g., resist deformation, poor mold release (sticking) causing resist peeling, and damage leading to loss of dimensional integrity, pattern/feature definition, etc.

AFM images and cross-sectional profiles of replicated features obtained by imprinting a substrate/workpiece comprised of a layer of PMMA on an Al/NiP substrate, utilizing a Ni-based stamper/imprinter according to the above-described process, typically indicate poor replication quality and partial peeling of the PMMA layer from the surface of the glass substrate is frequently observed upon separation of the Ni-based stamper/imprinter from the PMMA layer. It has been determined that the peeling was caused by relative movement between the stamper/imprinter and the substrate/workpiece which occurred during the temperature cycling of the process, since the thermal expansion/contraction characteristics of the Ni-based stamper/imprinter and the Al/NiP-based substrate/workpiece are significantly different. The frequency of tearing and lifting off of the thermoplastic polymeric resist layer from the media substrate during separation of the stamper/imprinter from the imprinted substrate/workpiece is increased when the thermal imprint process is applied to large area substrates/workpieces, e.g., 95 mm diameter disks utilized in the manufacture of hard disk media.

In view of the foregoing, there exists a need for improved stampers/imprinters which are free of the above-described problems, drawbacks, and disadvantages problems, drawbacks, and disadvantages attendant upon the use of Ni-based and similar type "father", "mother", and "son" stampers/imprinters in patterning of recording media. Moreover, there exists a need for methodologies which facilitate rapid, reliable, and cost-effective manufacture of the improved stampers/imprinters for use in rapid, reliable, accurate, and cost-effective patterning of a variety of types of recording media by means of thermally assisted nano-imprint lithography. The recording media types which may be fabricated according to the inventive means and methodology include, but are not limited to, ultra-high areal recording density bit patterned magnetic media, servo patterned magnetic and magneto-optical (MO) recording media, and various types of CD and DVD recording media.

The present invention addresses and solves the aforementioned problems, drawbacks, and disadvantages associated with the use of conventional stampers and manufacturing techniques therefor, while maintaining full compatibility with the requirements of cost-effective manufacturing technology.

DISCLOSURE OF THE INVENTION

An advantage of the present invention is an improved method of manufacturing stampers/imprinters adapted for use in patterning various types of recording media via thermally assisted nano-imprint lithography, and improved stampers/imprinters obtained thereby.

Another advantage of the present invention is improved stampers/imprinters adapted for use in patterning various types of recording media.

Yet another advantage of the present invention is an improved method of fabricating patterned recording media utilizing thermally assisted nano-imprint lithography.

Additional advantages and other aspects and features of the present invention will be set forth in the description which follows and in part will become apparent to those having ordinary skill in the art upon examination of the following or may be learned from the practice of the present invention. The advantages of the present invention may be realized and obtained as particularly pointed out in the appended claims.

According to an aspect of the present invention, the foregoing and other advantages are obtained in part by an improved method of manufacturing a stamper/imprinter for patterning a recording medium, comprising steps of:

(a) selecting a recording medium to be patterned, the recording medium comprising a substrate having a first coefficient of thermal expansion (CTE);

(b) providing a first stamper/imprinter comprising a topographically patterned surface having a correspondence to a selected pattern to be formed in a surface of the selected recording medium;

(c) providing a sheet of a material having a second CTE matching the first CTE;

(d) molding a layer of a polymeric material surrounding the sheet of material and having a surface in conformal contact with the topographically patterned surface of the first stamper/imprinter; and (e) separating the layer of polymeric material from the topographically patterned surface of the first stamper/imprinter to form a second stamper/imprinter comprising a topographically patterned stamping/imprinting surface having a correspondence to the selected pattern to be formed in a surface of the selected recording medium.

Preferred embodiments of the present invention include those wherein step (a) comprises selecting a recording medium from the group consisting of: magnetic media, magneto-optical ("MO") media, read-only ("ROM") media, readable compact disk ("CD-R") media, readable-writable compact disk ("CD-RW") media, and digital video disk ("DVD") media; and the substrate having the first coefficient of thermal expansion (CTE) is selected from the group consisting of: Al, Al-based alloys, glass, ceramics, glass-ceramics, polymeric materials, and composites or laminates of these materials; step (b) comprises providing a first stamper/imprinter comprising a topographically patterned stamping/imprinting surface including a plurality of projections and depressions with dimensions and spacings having a correspondence to a selected pattern for forming servo-patterned magnetic or magneto-optical ("MO") media, track-patterned magnetic media, bit patterned magnetic media, patterned read-only ("ROM") media, wobble-groove patterned readable compact disk ("CD-R") media, readable-writable compact disk ("CD-RW") media, or digital video disk ("DVD") media; step (c) comprises providing a sheet of a material selected from the group consisting of: Al, Al-based alloys, glass, ceramics, glass-ceramics, polymers, and composites or laminates thereof; and step (c) comprises injection molding the layer of polymeric material.

According to particular embodiments of the present invention, step (a) comprises selecting a recording medium comprising an Al or Al-based alloy substrate; step (b) comprises providing a first stamper/imprinter wherein the topographically patterned stamping/imprinting surface comprises Ni or a Ni-based alloy; step (c) comprises providing a sheet of Al or an Al-based alloy material; and step (d) comprises injection molding a layer of a polymeric material selected from the group consisting of:

(i) amorphous thermoplastic polymers having a high glass transition temperature $T_g$ of at least about 150° C.;

(ii) semi-crystalline polymers; and (iii) crystalline polymers.

Preferred embodiments of the present invention include those wherein the amorphous thermoplastic polymers include materials selected from the group consisting of: polycarbonates (PCs), polyetherimides (PEIs), polyether sulfones (PESs), and polysulfones (PSUs); the semi-crystalline polymers include materials selected from the group consisting of: polyphenylene sulfides (PPSs), polyphthalimides (PPAs), and polyetheretherketones (PEEKs); and the crystalline polymers include liquid crystal polymers (LCPs). In each instance, the polymeric material is filled or unfilled, reinforced or unreinforced, and with additives or without additives.

Further preferred embodiments of the present invention include those wherein the polymeric material contains a release material, as when the release material comprises at least one lubricant material.

Another aspect of the present invention is improved molded (and injection molded) stampers/imprinters fabricated by means of the above-described methodology for use in forming patterned recording media of various types, including, but not limited to: servo-patterned magnetic or magneto-optical ("MO") media, track-patterned magnetic media, bit patterned magnetic media, patterned read-only ("ROM") media, wobble-groove patterned readable compact disk ("CD-R") media, readable-writable compact disk ("CD-RW") media, and digital video disk ("DVD") media.

Yet another aspect of the present invention is an improved stamper/imprinter for forming a pattern in a surface of a recording medium including a substrate having a first coefficient of thermal expansion (CTE), the stamper/imprinter comprising a layer of polymeric material with a topographically patterned stamping/imprinting surface having a correspondence to the pattern, the layer of polymeric material surrounding a sheet of a material having a second CTE matching the first CTE.

According to embodiments of the invention, the topographically patterned stamping/imprinting surface includes a plurality of projections and depressions with dimensions and spacings having a correspondence to a selected pattern utilized in forming a servo-patterned magnetic or magneto-optical ("MO") medium, a track-patterned magnetic medium, a bit patterned magnetic medium, a patterned read-only ("ROM") medium, a wobble-groove patterned readable compact disk ("CD-R") medium, a readable-writable compact disk ("CD-RW") medium, or a digital video disk ("DVD") medium.

Preferably, the layer of polymeric material comprises at least one material selected from the group consisting of: amorphous thermoplastic polymers having a high glass transition temperature $T_g$ of at least about 150° C., semi-crystalline polymers, and crystalline polymers, wherein the amorphous thermoplastic polymers include materials selected from the group consisting of: polycarbonates (PCs), polyetherimides (PEIs), polyether sulfones (PESs), and polysulfones (PSUs); the semi-crystalline polymers include materials selected from the group consisting of: polyphenylene sulfides (PPSs), polyphthalimides (PPAs), and polyetheretherketones (PEEKs); and the crystalline polymers include liquid crystal polymers (LCPs).

Further preferred embodiments of the invention include those wherein the polymeric material contains a release material, the release material comprising at least one lubricant material.

Still another aspect of the present invention is an improved method of fabricating a patterned recording medium utilizing thermally assisted nano-imprint lithography, comprising steps of:

(a) providing a recording medium including a surface for forming a pattern therein, the recording medium comprising a substrate having a first coefficient of thermal expansion (CTE);

(b) forming a layer of a thermoplastic polymer material on the surface of the recording medium;

(c) providing a stamper/imprinter having a topographically patterned stamping/imprinting surface corresponding to a negative image of the pattern, the stamper/imprinter comprising a layer of polymeric material surrounding a sheet of a material having a second CTE matching the first CTE;

(d) forming the pattern in a surface of the layer of thermoplastic material by urging the topographically patterned stamping/imprinting surface of the stamper/imprinter into contact with the surface of the layer of thermoplastic polymer material while maintaining the layer of thermoplastic polymer material and the layer of polymeric material of the stamper/imprinter at an elevated temperature; and (e) separating the stamper/imprinter from the layer of thermoplastic polymer material.

Preferred embodiments of the present invention include those wherein step (a) comprises providing a recording medium selected from the group consisting of: magnetic media, magneto-optical ("MO") media, read-only ("ROM") media, readable compact disk ("CD-R") media, readable-writable compact disk ("CD-RW") media, and digital video disk ("DVD") media; step (b) comprises forming a layer of a first thermoplastic polymer material having a first glass transition temperature $T_{g1}$; step (c) comprises providing a stamper/imprinter comprising a layer of polymeric material comprising at least one polymeric material selected from the group consisting of: amorphous thermoplastic polymers having a second glass transition temperature $T_{g2}$ greater than the first glass transition temperature $T_{g1}$ of the first thermoplastic polymer, semi-crystalline polymers, and crystalline polymers; and step (d) comprises forming a pattern for a servo-patterned magnetic or magneto-optical ("MO") medium, a track-patterned magnetic medium, a bit patterned magnetic medium, a patterned read-only ("ROM") medium, a wobble-groove patterned readable compact disk ("CD-R") medium, a readable-writable compact disk ("CD-RW") medium, or a digital video disk ("DVD") medium.

According to preferred embodiments of the present invention, the amorphous thermoplastic polymers include materials selected from the group consisting of: polycarbonates (PCs), polyetherimides (PEIs), polyether sulfones (PESs), and polysulfones (PSUs); the semi-crystalline polymers include materials selected from the group consisting of: polyphenylene sulfides (PPSs), polyphthalimides (PPAs), and polyetheretherketones (PEEKs); and the crystalline polymers include liquid crystal polymers (LCPs).

Preferably, step (a) comprises providing a recording medium wherein the substrate is selected from the group consisting of: Al, Al-based alloys, glass, ceramics, glass-ceramics, polymeric materials, and composites or laminates of these materials; step (b) comprises forming a layer of a first thermoplastic polymer material comprising at least one member of the group consisting of: polymethylmethacrylate (PMMA), styrene-acrylonitrile (SAN), polystyrene (PS), polycarbonate (PC), and co-polymers and multi-component polymer blends thereof; and step (c) comprises providing a stamper/imprinter wherein the sheet of material is selected from the group consisting of: Al, Al-based alloys, glass, ceramics, glass-ceramics, polymers, and composites or laminates thereof.

Further preferred embodiments of the present invention include those wherein step (c) comprises providing a stamper/imprinter wherein said polymeric material contains a release material, as when the release material comprises at least one lubricant material.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects. Accordingly, the drawings and description are to be regarded as illustrative in nature, and not as limitative.

BRIEF DESCRIPTION OF THE DRAWINGS

The following detailed description of the embodiments of the present invention can best be understood when read in conjunction with the following drawings, in which the various features are not necessarily drawn to scale but rather are drawn as to best illustrate the pertinent features, wherein.

DESCRIPTION OF THE INVENTION

Figure 1A:
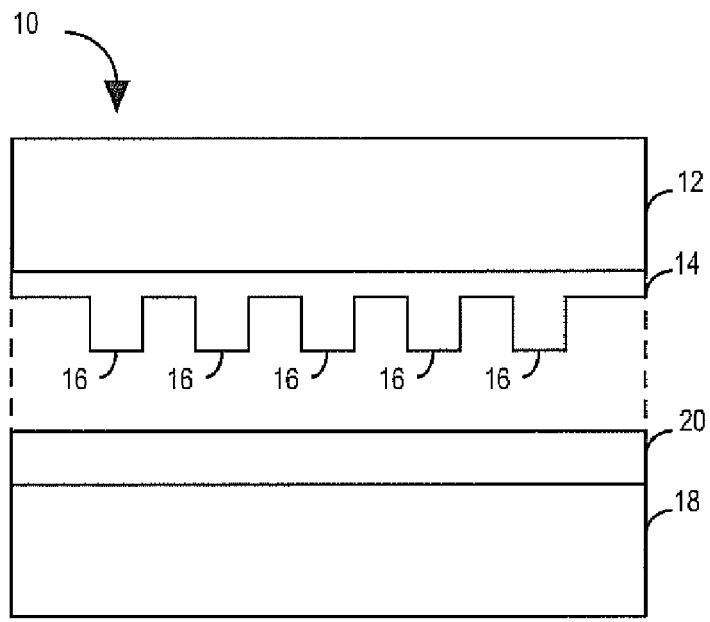
FIGS. 1 (A)-1 (D) illustrate, in simplified cross-sectional schematic views, a process for performing thermally assisted nano-imprint lithography of a thin film on a substrate (workpiece) surface for forming nano-dimensioned features in the surface of the substrate, according to the conventional art.
Figure 1B:
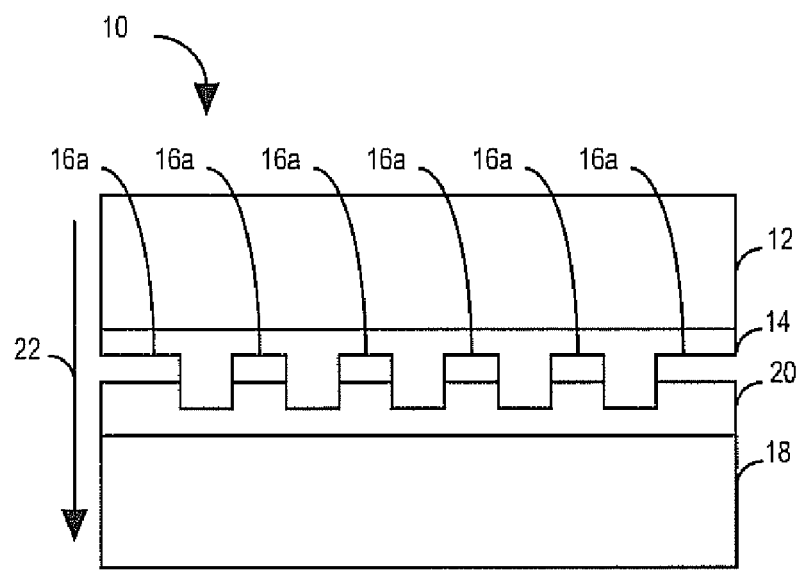
Figure 1C:
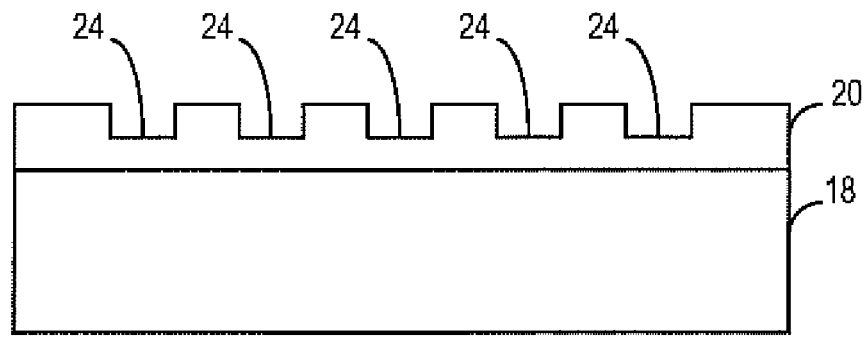
Figure 1D:
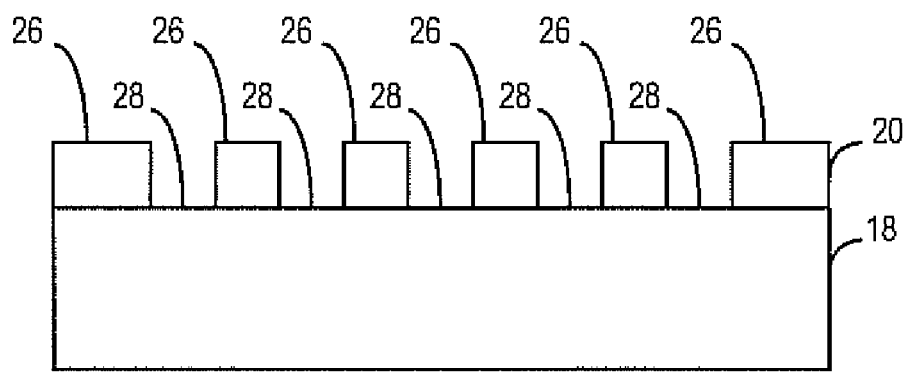
Figure 2A:
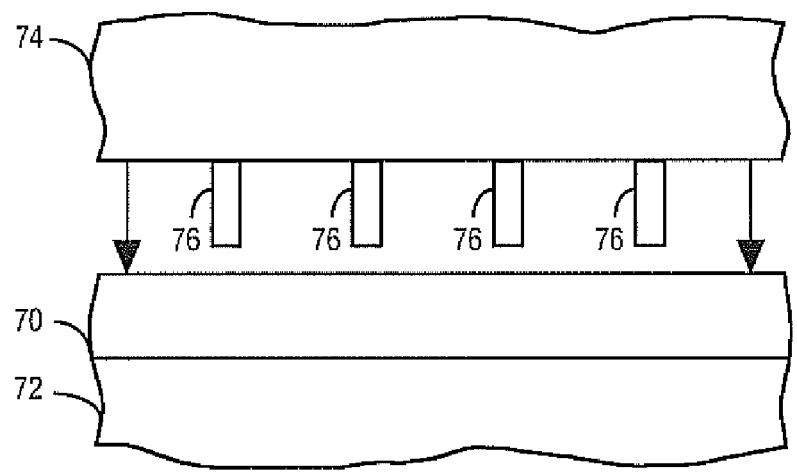
FIGS. 2 (A)-2 (D) illustrate, in simplified, schematic cross-sectional views, a series of process steps for fabrication of bit patterned or servo patterned recording media utilizing thermal imprint lithography as part of the processing methodology.
Figure 2B:
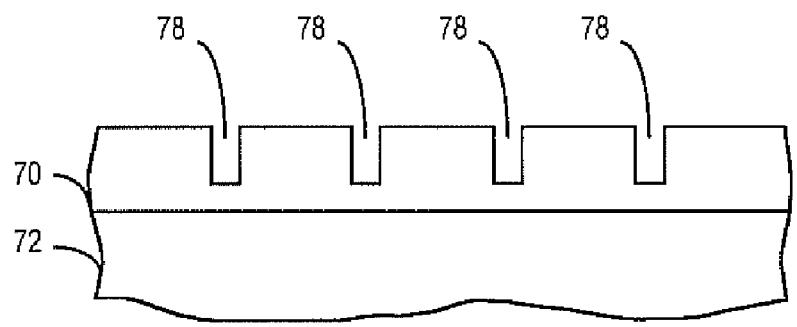
Figure 2C:
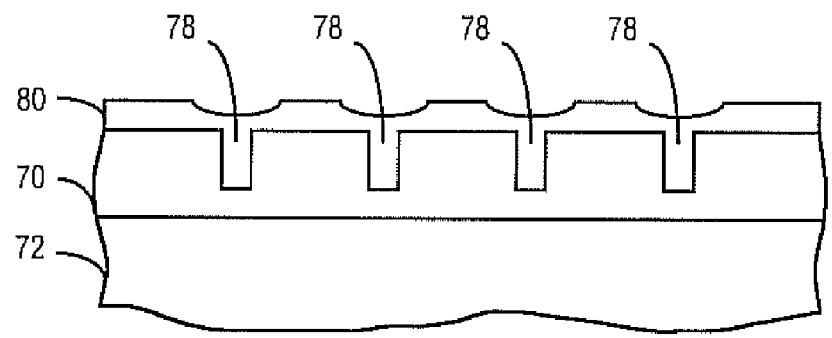
Figure 2D:
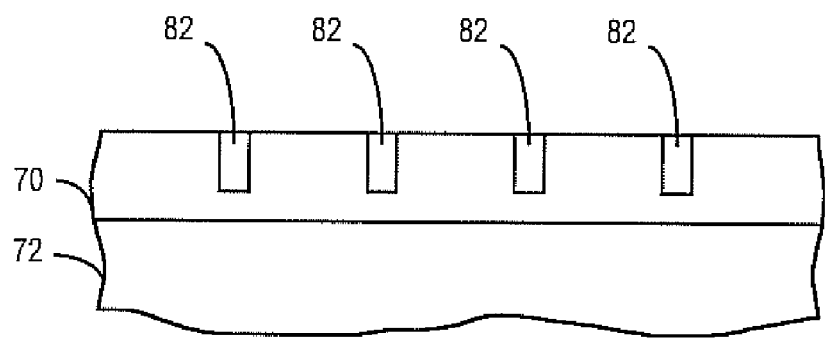
Figure 3:
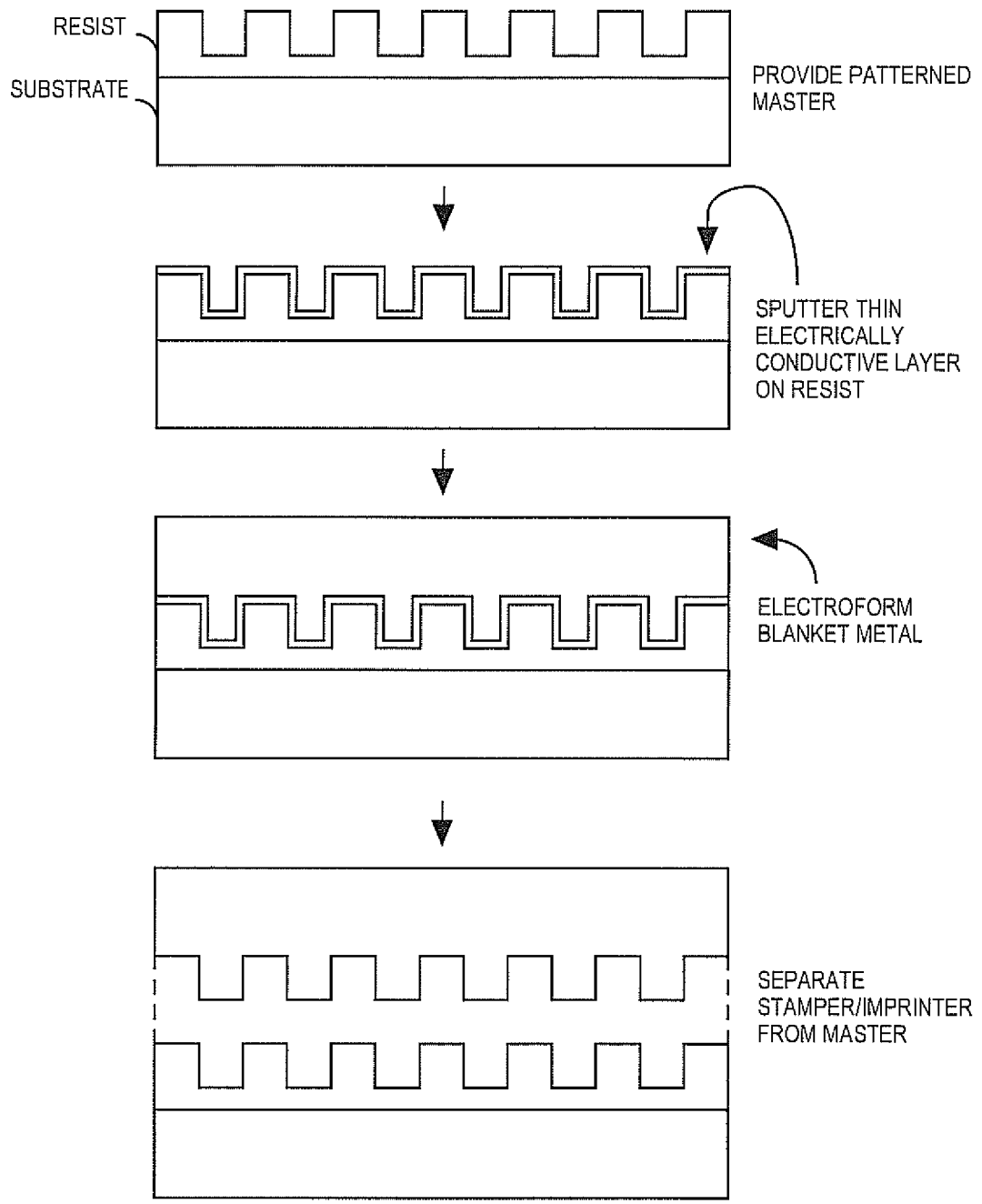
FIG. 3 illustrates, in simplified, schematic cross-sectional views, a series of process steps for fabrication of a stamper/imprinter utilizing a "master" stamper/imprinter, according to the conventional art.
Figure 4:
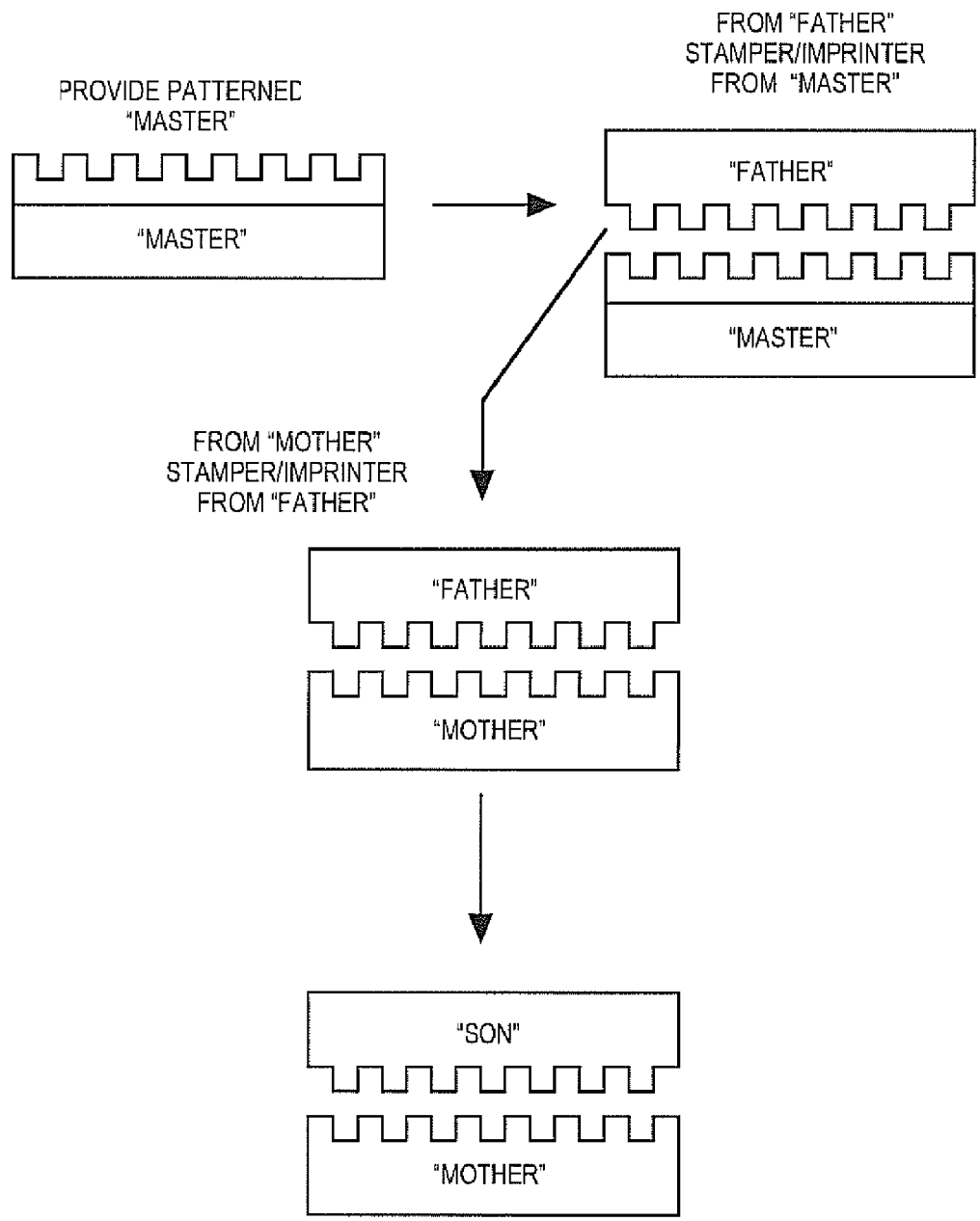
FIG. 4 illustrates, in simplified, schematic cross-sectional views, a series of process steps for fabrication of "father", "mother", and "son" stamper/imprinters originating from a "master" stamper/imprinter.

The present invention addresses and solves the above-described problems, disadvantages, and drawbacks attendant upon forming various types of patterned recording media, including, for example, bit patterned hard disk magnetic recording media and servo patterned magnetic and magneto-optical (MO) recording media, utilizing thermally assisted imprint lithography, while maintaining full capability with all aspects of automated manufacturing processing for pattern formation in recording media. Advantageously, the inventive means and methodology can be practiced in a cost-effective manner without requiring capital-intensive processing techniques and instrumentalities, while minimizing the requisite number of topographical patterning steps. Further, as has been indicated above, the means and methodology afforded by the present invention enjoy diverse utility in the manufacture of a number of different types of recording media and devices.

A key feature of the present invention is formation of improved stampers/imprinters utilized for performing thermally assisted nano-imprint lithographic patterning of recording media (as well as other devices requiring formation of nano-dimensioned features therein) which include integrally formed thermal expansion compensation means. The inventive stampers/imprinters are formed by a process comprising injection molding of a polymeric material utilizing a conventional, e.g., Ni-based, stamper/imprinter as a mold, wherein the molded polymeric material surround a sheet of a material having a coefficient of thermal expansion (CTE) matching the CTE of the substrate of the workpiece, e.g., recording medium, to be patterned. As a consequence of the closely matched CTE's of the stamper/imprinter and the workpiece, the disadvantageous phenomena of resist peeling, damage, etc., during the thermally assisted nano-imprinting process is effectively avoided, or at least minimized.

Such methodology therefore affords a number of advantages vis-à-vis conventional methodologies for forming high quality, faithfully replicated stampers/imprinters in quantities necessary for large scale manufacturing. For example, injection molding of the polymeric material utilizing a Ni-based stamper/imprinter as a mold provides excellent pattern replication fidelity without pattern breaking and degradation; the injection molding process is widely utilized in industry and is performed in economical fashion, whereby the fabrication cost of the stampers/imprinters is significantly reduced; the surface of the injection molded polymeric material is compatible with the thermoplastic polymers typically employed as resist materials in thermally assisted nano-imprint lithographic patterning processes; the coefficients of thermal expansion ("CTE") of the integral sheet of material and polymeric material can be closely matched to the CTE of the thermoplastic resist material so as to minimize damage to the thermoplastic resist material due to differences in CTE; and the polymeric material can readily accommodate formation of a layer of a release material thereon for facilitating damage-free release upon imprinting. Alternatively, the release material can be incorporated in the molten polymeric material utilized in the injection molding process, whereby the stamper/imprinter effectively attains a permanent release layer. According to the invention, the glass (or melting) temperature $T_g$ of a thermoplastic polymeric material of the injection molded stamper/imprinter must be sufficiently high as to withstand the elevated temperature of the imprinting process without incurring pattern deformation, and substantially higher than the glass temperature $T_g$ of the thermoplastic polymer material of the resist layer on the substrate/workpiece.

According to the invention, the injection molding process advantageously provides excellent replication fidelity of the topographical features of the Ni-based stampers/imprinters when the process is performed at high mold temperature, high melt temperature, and at high injection rate.

Figure 5:
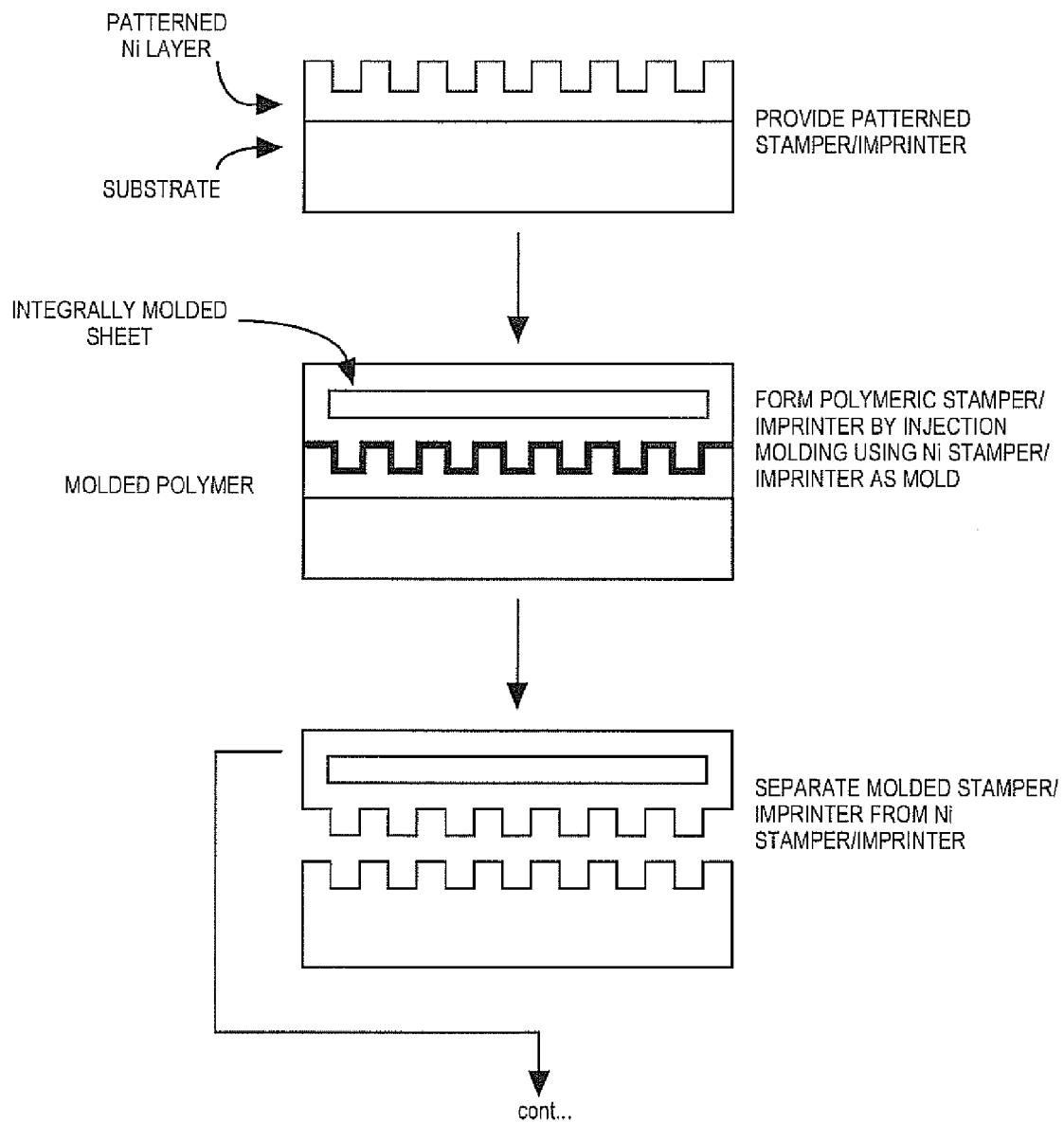
FIG. 5 illustrates, in simplified, schematic cross-sectional views, a series of process steps for fabrication of an injection molded polymer-based stamper/imprinter according to the invention and its subsequent use in fabrication of bit patterned or servo patterned recording media utilizing thermal imprint lithography.
Figure 5:
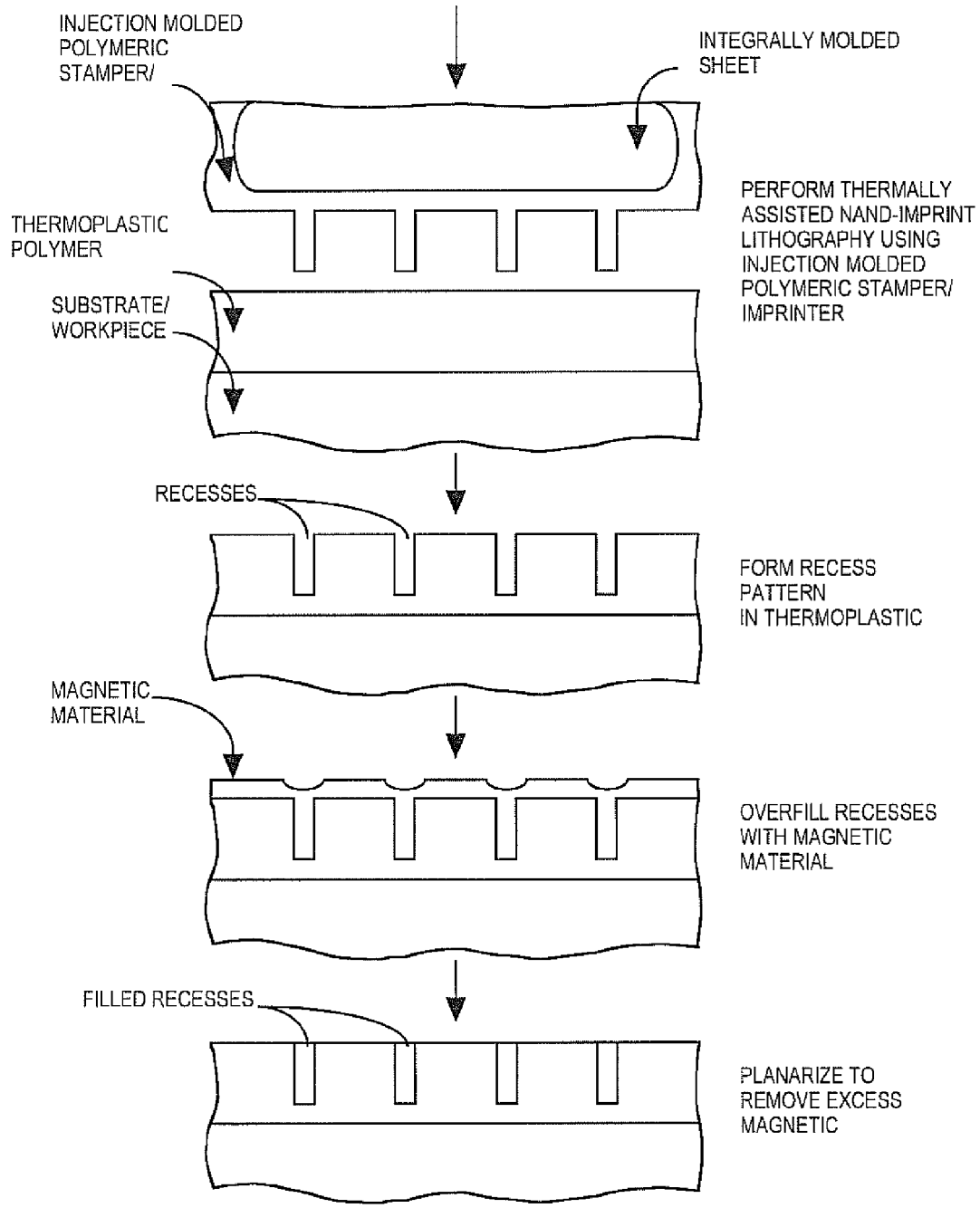

Referring to FIG. 5, shown therein, in simplified, schematic cross-sectional views, is a series of process steps for fabrication of an injection molded polymer-based stamper/imprinter according to the invention and its subsequent use in fabrication of bit patterned or servo patterned recording media utilizing thermal imprint lithography.

As indicated in the uppermost view of FIG. 5, in an initial step according to the inventive methodology, a first stamper/imprinter is provided comprising a topographically patterned surface including a plurality of projections and depressions with dimensions and spacings having a correspondence to a selected pattern to be formed in a surface of a device such as a recording medium. In a second step, a layer of a polymeric material is injection molded in conformal contact with the topographically patterned surface of the first stamper/imprinter; and in a third step the injection molded layer of polymeric material is separated from the topographically patterned surface of the first stamper/imprinter to form a second, injection molded, polymer-based stamper/imprinter comprising a topographically patterned stamping/imprinting surface including a plurality of projections and depressions with dimensions and spacings having a correspondence to the selected pattern to be formed in a surface of a the recording medium.

According to the invention, the first stamper/imprinter is provided as comprising a topographically patterned stamping/imprinting surface with features including a plurality of projections and depressions with dimensions and spacings having a correspondence to a selected pattern utilized for forming a desired device or product, e.g., a servo-patterned magnetic or magneto-optical ("MO") medium, a track-patterned magnetic medium, a bit patterned magnetic medium, a patterned read-only ("ROM") medium, a wobble-groove patterned readable compact disk ("CD-R") medium, a readable-writable compact disk ("CD-RW") medium, or a digital video disk ("DVD") medium. Typically, the topographically patterned stamping/imprinting surface of the first stamper/imprinter comprises Ni or a Ni-based alloy.

The injection molding step comprises "co-injection" molding a layer of at least one polymeric material selected from the group consisting of: amorphous thermoplastic polymers having a high glass transition temperature $T_g$ of at least about 150° C., semi-crystalline polymers, and crystalline polymers. Preferably, the amorphous thermoplastic polymers include materials selected from the group consisting of: polycarbonates (PCs), polyetherimides (PEIs), polyether sulfones (PESs), and polysulfones (PSUs); the semi-crystalline polymers include materials selected from the group consisting of: polyphenylene sulfides (PPSs), polyphthalimides (PPAs), and polyetheretherketones (PEEKs); and the crystalline polymers include liquid crystal polymers (LCPs). In each instance, the polymeric material is filled or unfilled, reinforced or unreinforced, and with additives or without additives.

The injection molding process is performed so as to: (1) include a surface in conformal, replicating contact with the topographically patterned imprinting surface of the first stamper/imprinter, and (2) surround a sheet of an insert material having a coefficient of thermal expansion (CTE) which matches the CTE of the substrate material of the recording medium to subsequently be patterned using the molded stamper/imprinter. In order to readily achieve such matching of CTE's, the material of the insert sheet is preferably the same as, or at least similar to, the substrate material, and is typically selected from among typical media substrate materials, including Al, Al-based alloys, glass, ceramics, glass-ceramics, polymeric materials, and composites and laminates of these materials. The thickness of the insert sheet should substantially exceed the thickness of the molded polymer layer(s), whereby the CTE of the stamper/imprinter is largely determined by the CTE of the insert sheet.

An advantageous feature of the present invention is the ability to include release material(s) in the molten polymeric material utilized in the injection molding step, the release material(s) comprising at least one lubricant material.

The utility of the present invention in the manufacture of all manner of products and devices requiring formation of nano-dimensioned pattern features is demonstrated in the subsequent views shown in FIG. 5. According to the illustrated embodiment, a patterned recording medium is fabricated utilizing thermally assisted nano-imprint lithography.

Specifically, in the fourth view of FIG. 5, a recording medium including a surface for forming a selected pattern therein is provided with a layer of a thermoplastic polymer resist material on the surface thereof, the thermoplastic polymer material having a first glass transition temperature $T_{g1}$; and the previously formed stamper/imprinter comprising an injection molded layer of polymeric material with a topographically patterned stamping/imprinting surface including a plurality of projections and depressions with dimensions and spacings corresponding to a negative image of the selected pattern to be formed in the surface of the recording medium is provided in proximity to the layer of thermoplastic resist material. According to an illustrative, but non-limitative, embodiment of the inventive methodology, the integrally molded insert sheet of the molded polymeric stamper/imprinter is comprised of a material having a CTE which substantially matches the CTE of the substrate material of the recording medium. Typically, the insert material is selected to be identical to the substrate material in order to facilitate CTE matching.

The polymeric material of the injection molded layer has a second glass transition temperature $T_{g2}$ greater than the first glass transition temperature $T_{g1}$. As indicated by the downwardly facing arrows in the figure, the injection molded polymeric stamper/imprinter is moved toward the thermoplastic polymer layer and urged against it to form an imprinted pattern therein which is a negative image of the pattern of the downwardly extending features of the stamper/imprinter in the form of recesses, as shown in the fifth view of FIG. 5. During the imprinting process, the layer of thermoplastic polymer material and a layer of thermoplastic polymeric material of the stamper/imprinter are maintained at a temperature $T_{imprint}$ between the first glass transition temperature $T_{g1}$ and the second glass transition temperature $T_{g2}$, in order to facilitate the imprinting process. By way of illustration only, if the thermoplastic polymer resist material is polymethylmethacrylate (PMMA) with $T_{g1}$ of about 95° C., and the imprinting surface of the stamper/imprinter comprises a thermoplastic polymer material, e.g., polycarbonate (PC) with $T_{g2}$ of about 150° C., a suitable imprinting temperature $T_{imprint}$ is about 120° C. In addition to polymethylmethacrylate (PMMA), other thermoplastic polymer materials suitable for use as the thermoplastic resist material include, but are not limited to: styrene-acrylonitrile (SAN), polystyrene (PS), polycarbonate (PC), and co-polymers and multi-component polymer blends thereof.

Following separation of the stamper/imprinter from the imprinted layer of thermoplastic resist material, the imprinted layer may, if desired, be subjected to further processing to effect complete removal of the bottom portions of the recesses to thereby expose the surface of substrate/workpiece. As shown in the penultimate view of FIG. 5, the recesses are then filled with a layer of a magnetic recording material (or a plurality of stacked layers including seed, intermediate, etc., layers in addition to a layer of magnetic recording material) by means of any of a variety of deposition processes. As shown in the ultimate view of FIG. 5, excess material overfilling the recesses is then removed via a planarization process, e.g., chemical-mechanical polishing (CMP), to leave a plurality of filled recesses constituting single elements or bits each forming a single magnetic domain of a bit patterned medium.

The inventive methodology is not limited to use as described above in the illustrative example; rather, the invention can be practiced with a wide variety of workpieces and devices comprising substrates or layers requiring patterning. Moreover, the imprinted patterns capable of being formed by the invention are not limited to bit or servo patterns for magnetic recording media.

In the previous description, numerous specific details are set forth, such as specific materials, structures, reactants, processes, etc., in order to provide a better understanding of the present invention. However, the present invention can be practiced without resorting to the details specifically set forth. In other instances, well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in other combinations and environments and is susceptible of changes and/or modifications within the scope of the inventive concept as expressed herein.

What is claimed is:

1. A stamper/imprinter for forming a pattern in a surface of a recording medium including a substrate having a first coefficient of thermal expansion (CTE), said stamper/imprinter comprising a layer of polymeric material with a topographically patterned stamping/imprinting surface having a correspondence to said pattern, said layer of polymeric material surrounding a sheet of a material having a second CTE matching said first CTE.

2. The stamper/imprinter according to claim 1, wherein:
said topographically patterned stamping/imprinting surface includes a plurality of projections and depressions with dimensions and spacings having a correspondence to a selected pattern utilized in forming a servo-patterned magnetic or magneto-optical ("MO") medium, a track-patterned magnetic medium, a bit patterned magnetic medium, a patterned read-only ("ROM") medium, a wobble-groove patterned readable compact disk ("CD-R") medium, a readable-writable compact disk ("CD-RW") medium, or a digital video disk ("DVD") medium.

3. The stamper/imprinter according to claim 1, wherein said layer of polymeric material comprises at least one material selected from the group consisting of:
(i) amorphous thermoplastic polymers having a high glass transition temperature $T_g$ of at least about 150° C.;
(ii) semi-crystalline polymers; and
(iii) crystalline polymers.

4. The stamper/imprinter according to claim 3, wherein:
said amorphous thermoplastic polymers include materials selected from the group consisting of: polycarbonates (PCs), polyetherimides (PEIs), polyether sulfones (PESs), and polysulfones (PSUs);
said semi-crystalline polymers include materials selected from the group consisting of:
polyphenylene sulfides (PPSs), polyphtalimides (PPAs), and polyetheretherketones (PEEKs); and
said crystalline polymers include liquid crystal polymers (LCPs).

5. The stamper/imprinter according to claim 1, wherein:
said polymeric material contains a release material.

6. The stamper/imprinter according to claim 5, wherein:
said release material comprises at least one lubricant material.

7. A device comprising:
a sheet of material, wherein
a recording medium comprises a substrate having a first coefficient of thermal expansion (CTE), and
said sheet of material has a second CTE matching said first CTE; and
a layer of a polymeric material surrounding said sheet of material wherein:
said sheet of material has a thickness that exceeds the thickness of said polymeric material; and
said layer of said polymetric material has a topographically patterned surface having a correspondence to a selected pattern to be formed in the recording medium.

8. The device as in claim 7, wherein:
said recording medium is selected from the group consisting of: magnetic media, magneto-optical ("MO") media, read-only ("ROM") media, readable compact disk ("CD-R") media, readable-writable compact disk ("CD-RW") media, and digital video disk ("DVD") media; and
said substrate having said first coefficient of thermal expansion (CTE) is selected from the group consisting of: Al, Al-based alloys, glass, ceramics, glass-ceramics, polymeric materials, and composites or laminates of these materials.

9. The device as in claim 7, wherein:
said topographically patterned surface includes a plurality of projections and depressions with dimensions and spacings having a correspondence to a selected pattern for forming servo-patterned magnetic or magneto-optical ("MO") media, track-patterned magnetic media, bit patterned magnetic media, patterned read-only ("ROM") media, wobble-groove patterned readable compact disk ("CD-R") media, readable-writable compact disk ("CD-RW") media, or digital video disk ("DVD") media.

10. The device as in claim 7, wherein:
said sheet of a material is selected from the group consisting of: Al, Al-based alloys, glass, ceramics, glass-ceramics, polymers, and composites or laminates thereof.

11. The device as in claim 7, wherein:
said recording medium comprises an Al or Al-based alloy substrate.

12. The device as in claim 7, wherein said polymeric material is selected from the group consisting of:
amorphous thermoplastic polymers having a high glass transition temperature $T_g$ of at least about 150° C.;
semi-crystalline polymers; and
crystalline polymers.

13. The device as in claim 12, wherein said amorphous thermoplastic polymers include materials selected from the group consisting of: polycarbonates (PCs), polyetherimides (PEIs), polyether sulfones (PESs), and polysulfones (PSUs).

14. The device as in claim 12, wherein said semi-crystalline polymers include materials selected from the group consisting of: polyphenylene sulfides (PPSs), polyphthalimides (PPAs), and polyetheretherketones (PEEKs).

15. The device as in claim 12, wherein said crystalline polymers include liquid crystal polymers (LCPs).

16. The device as in claim 7, wherein said polymeric material is filled, reinforced, or with additives.

17. The device as in claim 7, wherein said polymeric material contains a release material.

18. The device as in claim 7, wherein said release material comprises at least one lubricant material.

* * * * *